United States Patent
Booker et al.

(10) Patent No.: US 6,347,294 B1
(45) Date of Patent: Feb. 12, 2002

(54) UPGRADEABLE HIGHLY INTEGRATED EMBEDDED CPU SYSTEM

(75) Inventors: Alan Jay Booker, Holly Springs; William Robert Lee, Apex; Neil David Miles, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/158,267

(22) Filed: Sep. 22, 1998

(51) Int. Cl.[7] .............................................. G06F 13/00
(52) U.S. Cl. .......................... 703/28; 703/25; 710/126; 711/170; 712/32
(58) Field of Search .............................. 703/25, 27, 28; 711/170; 710/10, 107, 126; 712/32

(56) References Cited

U.S. PATENT DOCUMENTS

| | | | |
|---|---|---|---|
| 5,367,571 A | 11/1994 | Bowen et al. ................. 380/20 |
| 5,375,225 A | * 12/1994 | Dean et al. .................. 395/500 |
| 5,428,760 A | 6/1995 | Ghori et al. ................. 395/425 |
| 5,430,847 A | 7/1995 | Bradley et al. .............. 395/325 |
| 5,553,301 A | 9/1996 | New et al. ................... 395/825 |
| 5,587,734 A | 12/1996 | Lauder et al. ................ 348/10 |
| 5,619,250 A | 4/1997 | McClellan et al. ............ 348/10 |
| 5,636,361 A | 6/1997 | Ingerman .................... 395/477 |
| 5,675,772 A | 10/1997 | Liu et al. .................... 395/500 |
| 5,761,516 A | * 7/1998 | Rostoker et al. ............. 395/733 |
| 6,003,101 A | * 12/1999 | Lee ............................ 710/102 |
| 6,081,533 A | * 6/2000 | Laubach et al. ............. 370/421 |
| 6,105,119 A | * 8/2000 | Kerr et al. ................... 711/219 |

OTHER PUBLICATIONS

IBM Technical Disclosure Bulletin, "Synchronous Co-Processor Support In A Virtual Memory System", vol. 33, No. 6A, Nov. 1990.

* cited by examiner

Primary Examiner—Kevin J. Teska
Assistant Examiner—Thai Phan
(74) Attorney, Agent, or Firm—Sawyer Law Group

(57) ABSTRACT

A system and method in accordance with the present invention provides for an embedded CPU system which is upgradeable through the use of an external CPU which can be utilized therewith. In a first aspect, the embedded CPU system includes a CPU and a plurality of devices which are accessible by the CPU, via a device control register bus. The embedded CPU system includes logic coupled to the device control register bus for allowing access to the devices within the embedded CPU system by an external CPU. In a preferred embodiment the present invention provides a highly integrated set top box controller with a processor performance that services the low-end with the added advantage of additional performance with the EMCPU operating as an I/O assist processor to the EXCPU. When the EXCPU operates as the primary processor these two processors serve as a high end set top box controller. A system and method in accordance with the present invention can also preserve much of the software programming model when migrating from a low end processor set top box controller to a higher end solution. A system and method in accordance with the present invention also offers a choice of preserving much of the existing software investment by allowing different processor architectures to function as the EXCPU.

28 Claims, 9 Drawing Sheets

Multi-Processor Configuration of
Highly Integrated Set Top Box Controller

FIG. 6

Complete External Memory Bus Arbitration Sequence

| EMCPU SIGNALS | A | B | C | D | E | F | G | H | I | J |
|---|---|---|---|---|---|---|---|---|---|---|
| EM_HOLDREQ | 0 | 1 | 1 | 1 | 1 | 1 | 1 | 1 | 0 | 1 |
| EM_HOLDACK | 0 | 0 | 0 | 1 | 1 | 1 | 1 | 1 | 1 | 0 |
| EM_BUSREQ  | 0 | 0 | 0 | 0 | 0 | 0 | 1 | 1 | 1 | 0 |
| EXCPU SIGNALS | | | | | | | | | | |
| EX_HOLDREQ | 1 | 1 | 1 | 0 | 0 | 0 | 1 | 1 | 1 | 1 |
| EX_HOLDACK | 1 | 1 | 1 | 1 | 0 | 0 | 0 | 0 | 1 | 1 |
| EX_BUSREQ  | 0 | 1 | 1 | 1 | 0 | 0 | 0 | 0 | 0 | 0 |

FIG. 7

Arbitration Sequence Showing BusReq Simultaneous with HoldAck

| EMCPU SIGNALS | A | B | C | D | E | F |
|---|---|---|---|---|---|---|
| EM_HOLDREQ | 0 | 1 | 1 | 1 | 1 | 1 |
| EM_HOLDACK | 0 | 0 | 0 | 1 | 1 | 1 |
| EM_BUSREQ  | 0 | 0 | 0 | 1 | 1 | 1 |
| EXCPU SIGNALS | | | | | | |
| EX_HOLDREQ | 1 | 1 | 0 | 0 | 0 | 1 |
| EX_HOLDACK | 1 | 1 | 1 | 1 | 0 | 0 |
| EX_BUSREQ  | 0 | 1 | 1 | 1 | 0 | 0 |

EXCPU Write to a DCR Register

EXCPU Read from a DCR Register

The OE and CS are both low active signals

UPGRADEABLE HIGHLY INTEGRATED EMBEDDED CPU SYSTEM

FIELD OF THE INVENTION

The present invention relates generally to embedded central processing unit (CPU) systems and more particularly to a such a system which is upgradeable.

BACKGROUND OF THE INVENTION

Embedded central processing unit (CPU) systems are utilized in a variety of applications. For example, a set top box controller is utilized with a television or the like to provide certain functionality and performance to that television. Typically, a set top box includes a set top box controller which utilizes an embedded processor for providing initialization and control and application code execution. Choosing the correct level of processor performance for a set top box controller is a difficult task due to the varying needs of users and applications. It is important that as much of the logic should be integrated to reduce the product cost to the smallest quantity of chips, and the smallest silicon dies for those chips. However, by putting limits on the core performance available on a set top box, limits are placed on the number of applications which can run on the set top box.

Accordingly, what is desired is a wide range of processor performance solutions from a low end microprocessor using only minimal set up and control to a high end microprocessor implementing a highly interactive set top box. For example, the highly interactive set top box might include web browsing, Java processing, two dimensional (2D) and three dimensional (3D) graphics. Accordingly, while it is desirable to have a single chip implementation at lowest system cost, given the various customer needs, it is also desirable to have a set top box in which the CPU performance is such that it can be adjusted for those various user's needs. In addition, some customers have invested much software development in different processors' architectures.

Accordingly, it would be desirable to allow those different processor architectures to function with an integrated embedded CPU system, such as a set top box, to ensure a solution is available for customers with alternative CPU architectures. This secondary CPU or CPU alternative should have direct access to key on-chip resources of the embedded CPU system.

In a preferred embodiment this type of system would be implemented utilizing a multiprocessor architecture to allow for such upgrades.

To enable such a multiprocessor system to perform efficiently, the following requirements must be met:

(1) Low latency notification path between multiple processors
(2) Common memory space for all of the processors
(3) Minimize external memory fetches for instruction execution
(4) Direct access to key resources in the embedded processor by a stand alone CPU.

What is needed, therefore, is an embedded CPU system such as a set top box controller which includes a processor core that can be used in a complementary fashion with higher performing external stand alone processors with minimal glue logic. The stand-alone processor must also have a low latency direct access path to key resources in the embedded CPU system. The product should be cost effective, easy to implement, and adaptable to existing technologies. The present invention addresses such a need.

SUMMARY OF THE INVENTION

A system and method in accordance with the present invention provides for an embedded CPU system which is upgradeable through the use of an external CPU which can be utilized therewith. In a first aspect, the embedded CPU system includes a CPU and a plurality of devices which are accessible by the CPU, via a device control register bus. The embedded CPU system includes logic coupled to the device control register bus for allowing access to the devices within the embedded CPU system by an external CPU.

In a second aspect, a highly integrated set top box (HISTB) comprises an embedded CPU (EMCPU) subsystem; an MPEG subsystem; a memory subsystem; and a peripheral subsystem. The HISTB includes at least one bus for allowing communication between the EMCPU subsystem, the MPEG subsystem, the memory subsystem and the peripheral subsystem. A device control register (DCR) bus is provided for coupling the EMCPU subsystem, the MPEG subsystem, the memory subsystem. The HISTB also includes logic within the HISTB that allows an external CPU to access the MPEG subsystem and its control register space.

In a preferred embodiment the present invention provides a highly integrated set top box controller with a processor performance that services the low-end with the added advantage of additional performance with the EMCPU operating as an I/O assist processor to the EXCPU. When the EXCPU operates as the primary processor these two processors serve as a high end set top box controller. A system and method in accordance with the present invention can also preserve much of the software programming model when migrating from a low end processor set top box controller to a higher end solution. A system and method in accordance with the present invention also offers a choice of preserving much of the existing software investment by allowing different processor architectures to function as the EXCPU.

BRIEF DESCRIPTION OF THE DRAWINGS

FIG. 6 illustrates a complete cycle in the changes of state in the arbitration for the External Memory Bus.

FIG. 7 illustrates a special case that can occur in the arbitration sequence.

DETAILED DESCRIPTION OF THE INVENTION

The present invention relates to an improvement in embedded CPU systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A system and method in accordance with the present invention provides for an embedded CPU system which is upgradeable through the use of an external CPU which can be utilized therewith. The embedded CPU system includes a CPU and a plurality of devices which are accessible by the CPU, via a device control register bus. The embedded CPU system includes logic coupled to the device control register bus for allowing access to the devices within the embedded CPU system by an external CPU.

To further describe the scope and novelty of the present invention, the present invention will be hereinafter described within the context of a set top box controller. However, one of ordinary skill in the art readily recognizes that the present invention is applicable to any type of embedded processor system wherein there is a need to upgrade the system.

In accordance with the present invention, a highly integrated set top box (HISTB) controller is provided that includes a low-end Embedded CPU core (EMCPU), for example, a Power PC RISC processor, and the following subsystems: CPU Subsystem, an MPEG Subsystem, a Memory Subsystem and a Peripheral Subsystem.

In addition, the system can be upgraded using the HISTB controller in conjunction with a higher performance external CPU (EXCPU) such as a Pentium based or K6 processor. Accordingly, high and low performance set top box systems can be provided while utilizing the same core architecture.

Figure 1:
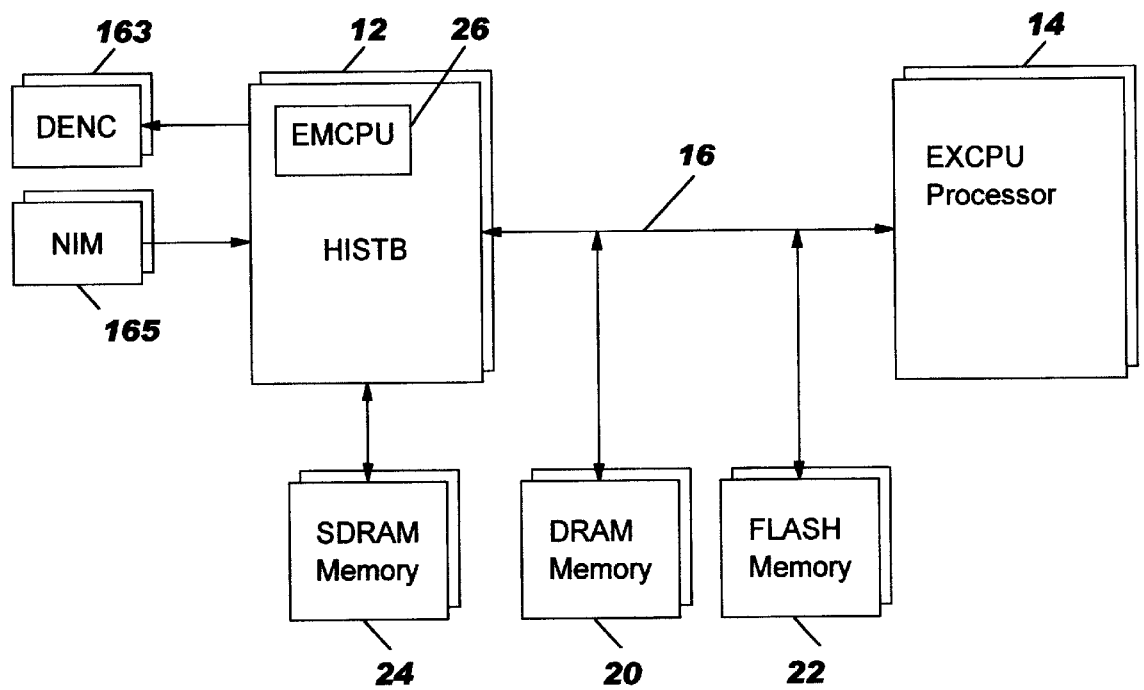
FIG. 1 is a block diagram of a multiprocessor configuration in accordance with the present invention.

FIG. 1 is a simple block diagram of the multiprocessor configuration 10 in accordance with the present invention. As is seen, there is a highly integrated set top box (HISTB) 12 controller which is in communication with an external CPU (EXCPU) 14 via a bus 16. As is also seen, memory, DRAM and Flash memories 20 and 22 are also accessible by either the HISTB controller 12 or the EXCPU 14. In addition, a SDRAM memory 24 is utilized by the embedded CPU (EMCPU) 26 of the HISTB controller 12.

Figure 2:
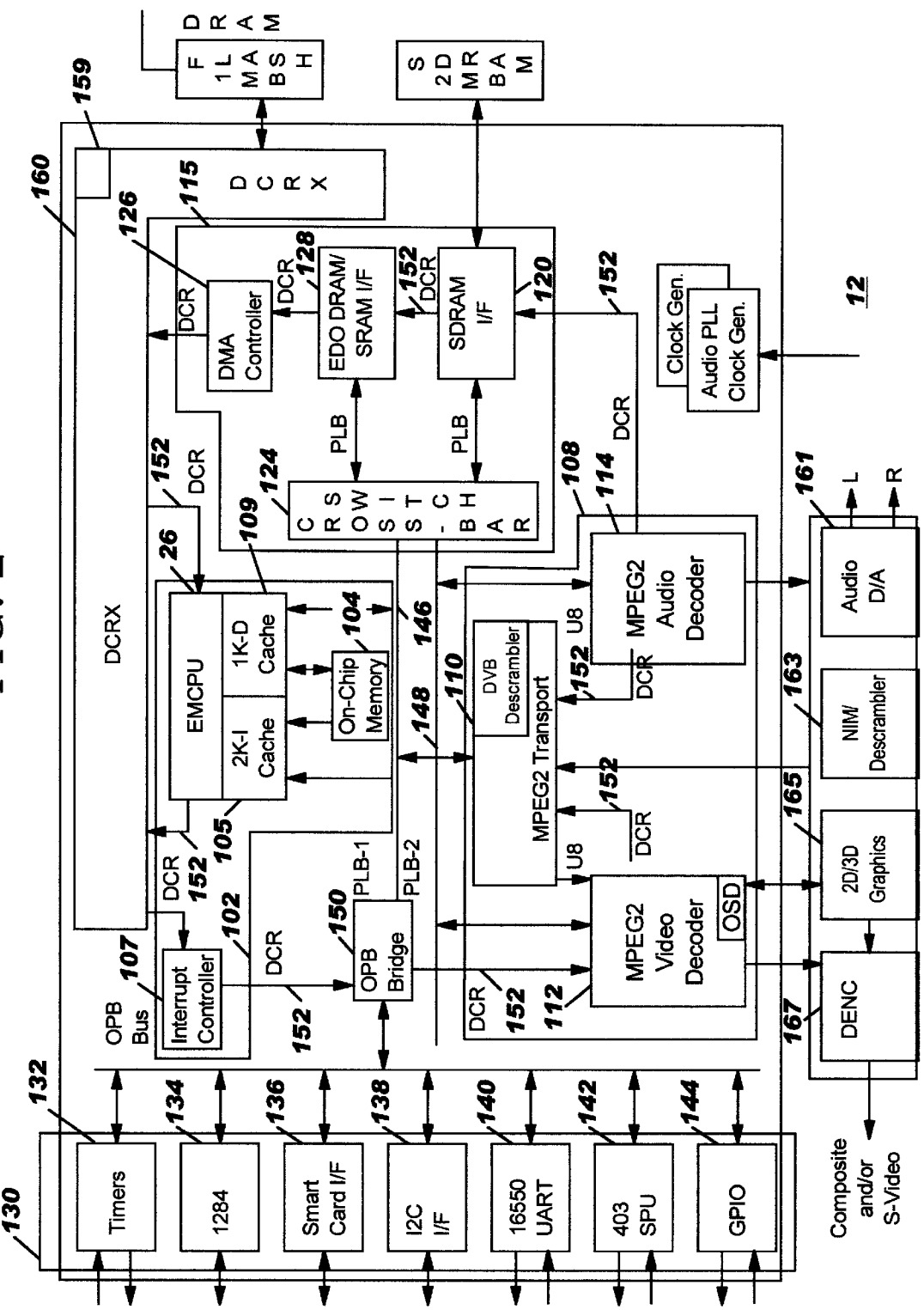
FIG. 2 is a detailed block diagram of a highly integrated set top box (HISTB) in accordance with the present invention.

As has been indicated, the HISTB controller 12 is a tightly coupled integrated system. FIG. 2 is a detailed block diagram of the HISTB controller 12. As is seen, the HISTB controller 12 includes a CPU subsystem 102 which includes the EMCPU 26 which, in a preferred embodiment, is a low end microprocessor core such as a 401 PowerPC RISC processor. The EMCPU 26 in a preferred embodiment includes a data cache 105 and an instruction cache 109. The CPU subsystem 102 also includes an on-chip memory (OCM) 104 which is in communication with the EMCPU 26. The CPU subsystem 102 also includes an interrupt controller 107 which is in communication with EMCPU 26.

The HISTB controller 12 also includes an MPEG subsystem 108. The MPEG system 108 includes an MPEG 2 transport demultiplexer 110, an MPEG2 video decoder 112, and an MPEG2 audio decoder 114. As is seen, the MPEG2 video decoder 112 and MPEG2 audio decoder 114 are coupled to the MPEG transport demultiplexer 110 and the processor local bus (PLB)-2 bus 148. As is seen, the MPEG subsystem 108 communicates with audio D/A converter 161, a NIM/descrambler 163, 2D/3D graphics device 165 and a digital encoder decoder (DENC) 167.

The HISTB controller 12 also includes a memory subsystem 115. The memory subsystem 115 includes a SDRAM memory interface controller 120, a SRAM/DRAM memory interface controller 128, a crossbar switch 124, and a DMA controller 126. As is seen, the crossbar switch 124 is coupled to DRAM/SRAM interface 128 and the SDRAM interface 120.

Finally, the HISTB controller 12 includes a peripheral subsystem 130. The peripheral subsystem 130 in a preferred embodiment includes general purpose timers 132, a 1284 peripheral device 134, a smart card interface 136, $I^2C$ interface 138, a universal asychronous receiver transmitter (UART) 140, a 403 serial port unit (SPU) 142 and a general purpose I/O (GPIO) 144 all coupled to an on chip peripheral (OPB) bus 151.

The CPU, memory and MPEG subsystems 102, 115 and 108 communicate with each other via PLB buses 146 and 148. The OPB bus 151 allows for communication between the peripheral subsystem 130 and the subsystems 102, and 115 via an OPB bridge 150. A device control register (DCR) bus 152 is provided between devices in the MPEG subsystem 100, CPU subsystem 102 and the memory subsystem 115. In a preferred embodiment, the DCR bus 152 is implemented as a ring in a daisy chained fashion. The DCR bus 152 allows for access to registers within each of the devices to allow for control of each device. In addition the system includes a DCR extension (DCRX) logic 160 which is coupled to SRAM-DRAM interface 128. The function of the DCRX logic 160 will be described in more detail hereinbelow.

Through the use of the HISTB controller 12, a more tightly coupled set top box controller is provided which is upgradable by coupling an EXCPU thereto as illustrated in FIG. 1. A HISTB controller 12 includes the following features which allow for an efficient, highly integrated upgradable set top box controller. These features are listed below.

1. Common Access to HISTB Register Space for EXCPU and EMCPU
2. Common Memory Space for Both EMCPU and EXCPU
3. Low Latency Notification Path from EXCPU to EMCPU
4. Low Latency Notification Path from EMCPU to EXCPU
5. On-Chip Memory (OCM) Reducing Memory Accesses Within Common Memory Space
6. Staged Power On Reset Mechanism
7. Unique CPU Intercommunication Protocol Each of these features will be described in more detail hereinbelow.

1. Common Access to HISTB Register Space for EXCPU and EMCPU

Figure 3:
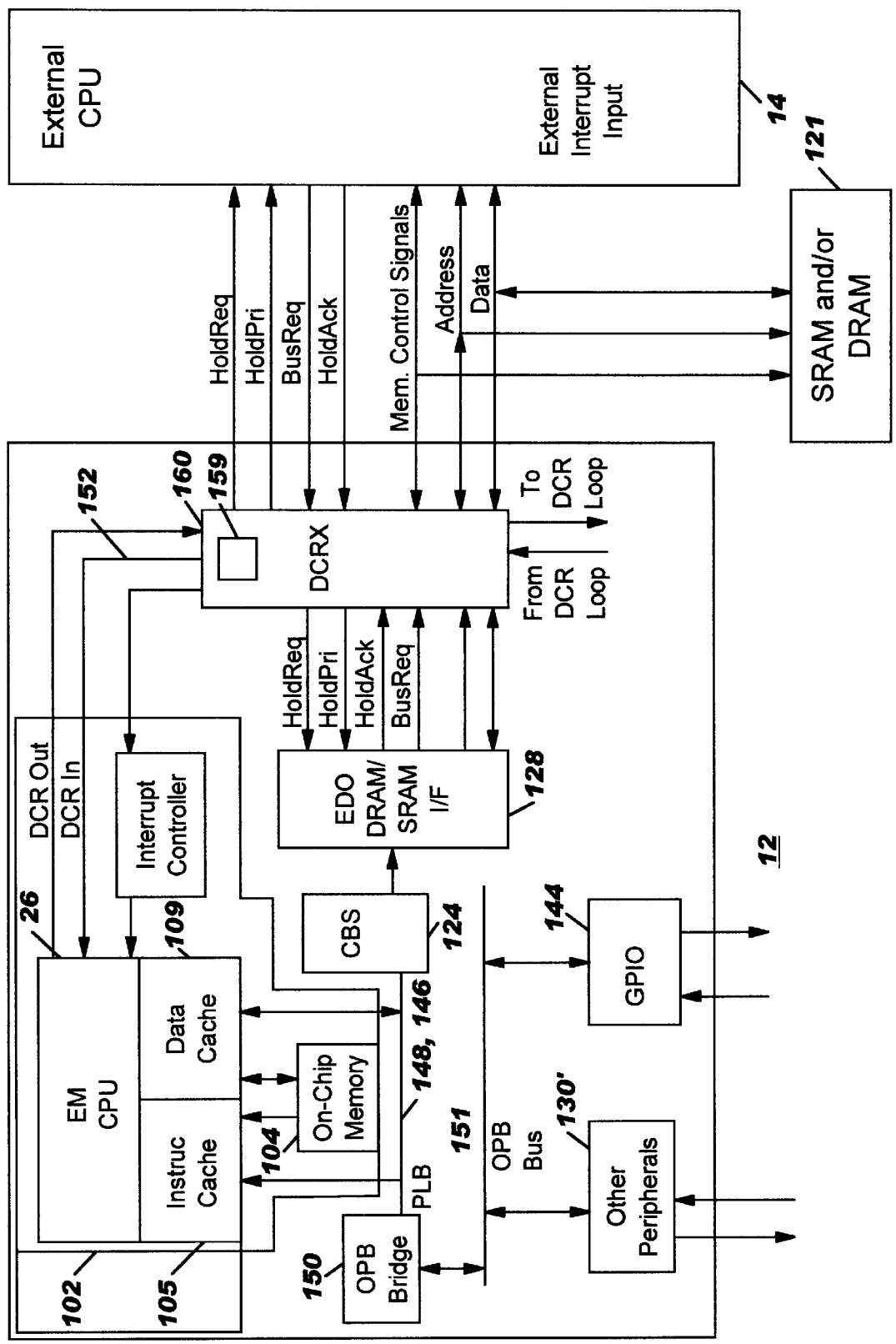
FIG. 3 is a block diagram illustrating the cooperation of the external CPU and an embedded CPU of the HISTB in accordance with the present invention.

FIG. 3 is a block diagram illustrating the cooperation of the EXCPU 14 and the EMCPU 26 of the HISTB controller 12 for common access to the DCR registers via the DCRX logic 160. FIG. 3 is a simplified version of the block diagram of FIG. 2. This figure illustrates the key devices related to the above-identified feature. As has been before mentioned, DCR registers are within the devices coupled to the DCR bus 152 provided which allows either the EXCPU 24 or the EMCPU 26 to control the devices in the HISTB controller 12. As is also seen control signals are passed through the DCRX logic 160 to allow for either the EMCPU 26 or the EXCPU 14 to control the devices.

A key element of the present invention is common access to the register space within the HISTB controller 12 by the EMCPU 26 and the EXCPU 14. As has been before mentioned, the DCR bus 152 is coupled to devices in the CPU subsystem 102, MPEG subsystem 108 and the memory subsystem 115 in the HISTB controller 12. Within each of those devices there are DCR registers which allow for control of these devices register by the EMCPU 26 reading and writing to and from these device control registers. In addition, as is seen, there is a DCRX logic that allows for either the EXCPU 14 or the EMCPU 26 to control the operation of the devices within the HISTB controller 12. Control and ownership of the external memory interface is provided through a plurality of arbitration control signals between the shared arbitration logic (not shown) of the external CPU 14 and the SRAM/DRAM memory interface controller 128. The arbitration details will be described in detail later.

The common access to the DCRX logic 160 control register 159 allows the EXCPU processor 14 to gain access to the entire control register space attached to the DCR bus, and specifically to the MPEG subsystem 108 (FIG. 2). Due to the amount of MPEG driver code exceeding the on-chip storage available, the EXCPU 14 should execute the MPEG subsystem 108 driver code directly from common shared memory. An alternative to this solution would be for the EXCPU 14 executing the MPEG driver code to post requests for writing/reading the on-chip register space via an interrupt to the EMCPU 26. However, the latency associated with servicing the interrupts could cause on-screen display artifacts and slow the response time for a channel change. The code that controls the MPEG subsystem 108 requires minimum change, whether running on the EMCPU 26 or the EXCPU 14. Existing customers invest many man-years in the software to control an MPEG subsystem 108 in a set-top box and large architectural changes are difficult to market to the existing customer base. With a system in accordance with the present invention, the only software difference between EMCPU 26 execution and EXCPU 14 execution is that load, store instructions are used by the EXCPU 14 and move to DCR (MTDCR)/move from DCR (MFDCR) instructions are used for the EMCPU 26 for access to the DCR register spare. The advantages of the EXCPU 14 controlling the MPEG subsystem 108 of the multiprocessor configuration are listed below:

(1) Reduced latency to MPEG control register access
(2) Reduces EMCPU code store keeping it in on-chip memory.

Figure 4:
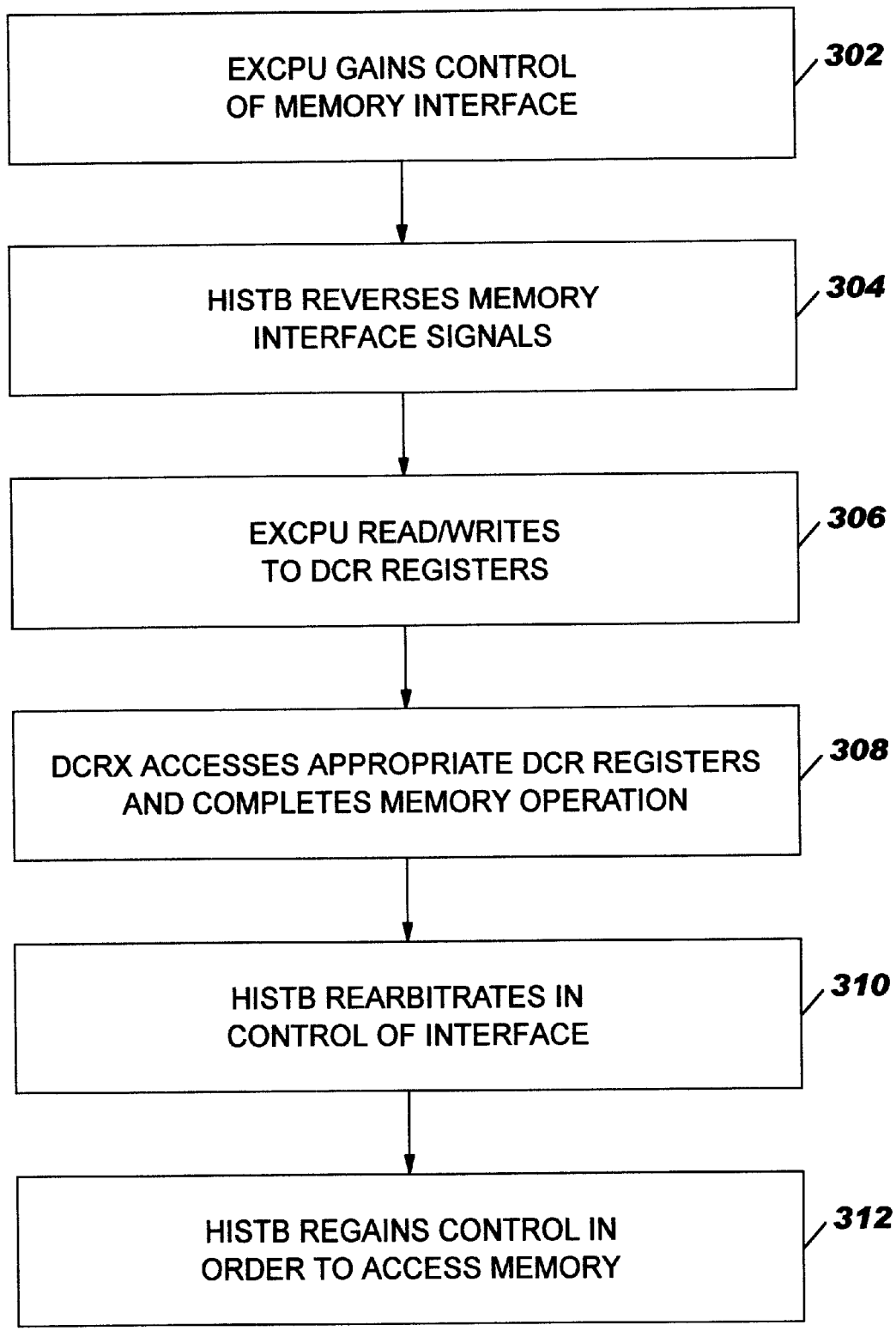
FIG. 4 is a flow chart of the operation of the external CPU and the embedded CPU when obtaining common access to the HISTB register space.

FIG. 4 is a flow chart of the operation of the EXCPU 14 and the EMCPU 26 when obtaining common access to the DCRX logic 160. First, the EXCPU 14 gains control of DCRX logic 160 or memory interface through arbitration, via step 302. Next, the HISTB controller 12 reverses direction of SRAM interface signals to provide a SRAM-like interface, via step 304. Thereafter, the EXCPU 14 reads/writes to address space where HISTB DCR registers are mapped, via step 306. Next, the DCRX logic 160 accesses the DCR register via the internal DCR bus 152 (bypassing EMCPU 26) and completes a memory operation, via step 308. At completion of the memory operation, the HISTB controller 12 rearbitrates for control of interface, via step 310. Finally, EXCPU 14 tri-states the memory interface and HISTB controller 12 regains control in order to access memory, via step 312.

The more typical implementation of the DCR 152 bus is a single master (EMCPU) and DCR slaves connected in a daisy chained ring. The arbitration circuitry at the beginning of the bus 152 enables either the EMCPU 26 or the EXCPU 14 to be the master.

While the EMCPU 26 normally receives an ACKknowledge signaling the end of a data transfer, the EXCPU 14 receives the device READY signal from the HISTB controller 12. This is referred to as device paced access. This implementation allows either processor to gain control of the DCR bus 152 at any time. If sharing the DCR bus 152 is required for the system implementation, communication between the EXCPU 14 and EMCPU 26 is required to insure completion of data transfers prior to switching DCR bus 152 master ownership.

The arbitration sequence for passing control of the DCR logic 160 is described hereinbelow. Assuming the HISTB controller 12 currently has control of the DCR ring 152 and the EXCPU 14 does not currently have any pending memory operations, the states of the arbitration signals shown in FIG. 3 are as follows:

| HoldReq to EXCPU = 1 | HoldAck from EXCPU = 1 |
| HoldPri to EXCPU = don't care | BusReq from EXCPU = 0 |

When the EXCPU 14 needs to gain control of the bus it asserts Bus Req. All other signals remain unchanged.

| HoldReq to EXCPU = 1 | HoldAck from EXCPU = 1 |
| HoldPri to EXCPU = don't care | BusReq from EXCPU = 1 |

When the HISTB controller 12 completes its current operation the HISTB internal arbiter will deassert the HoldReq to the EXCPU 14 indicating that it is no longer being held off the bus.

| HoldReq to EXCPU = 0 | HoldAck from EXCPU = 1 |
| HoldPri to EXCPU = don't care | BusReq from EXCPU = 1 |

The EXCPU 14 responds by deasserting the HoldAck and the BusReq signal.

| HoldReq to EXCPU = 0 | HoldAck from EXCPU = 0 |
| HoldPri to EXCPU = don't care | BusReq from EXCPU = 0 |

When the HISTB controller 12 needs to regain control of the bus it asserts the HoldReq to the EXCPU 14 and indicates the priority of the request via the HoldPri signal.

| HoldReq to EXCPU = 1 | HoldAck from EXCPU = 0 |
| HoldPri to EXCPU = 0/1 | BusReq from EXCPU = 0 |

The HoldPri is only needed until the EXCPU 14 Acknowledges the HoldReq by asserting HoldAck. The HISTB controller 12 regains control of the memory interface bus.

| HoldReq to EXCPU = 1 | HoldAck from EXCPU = 1 |
| HoldPri to EXCPU = don't care | BusReq from EXCPU = 0 |

Figure 5:
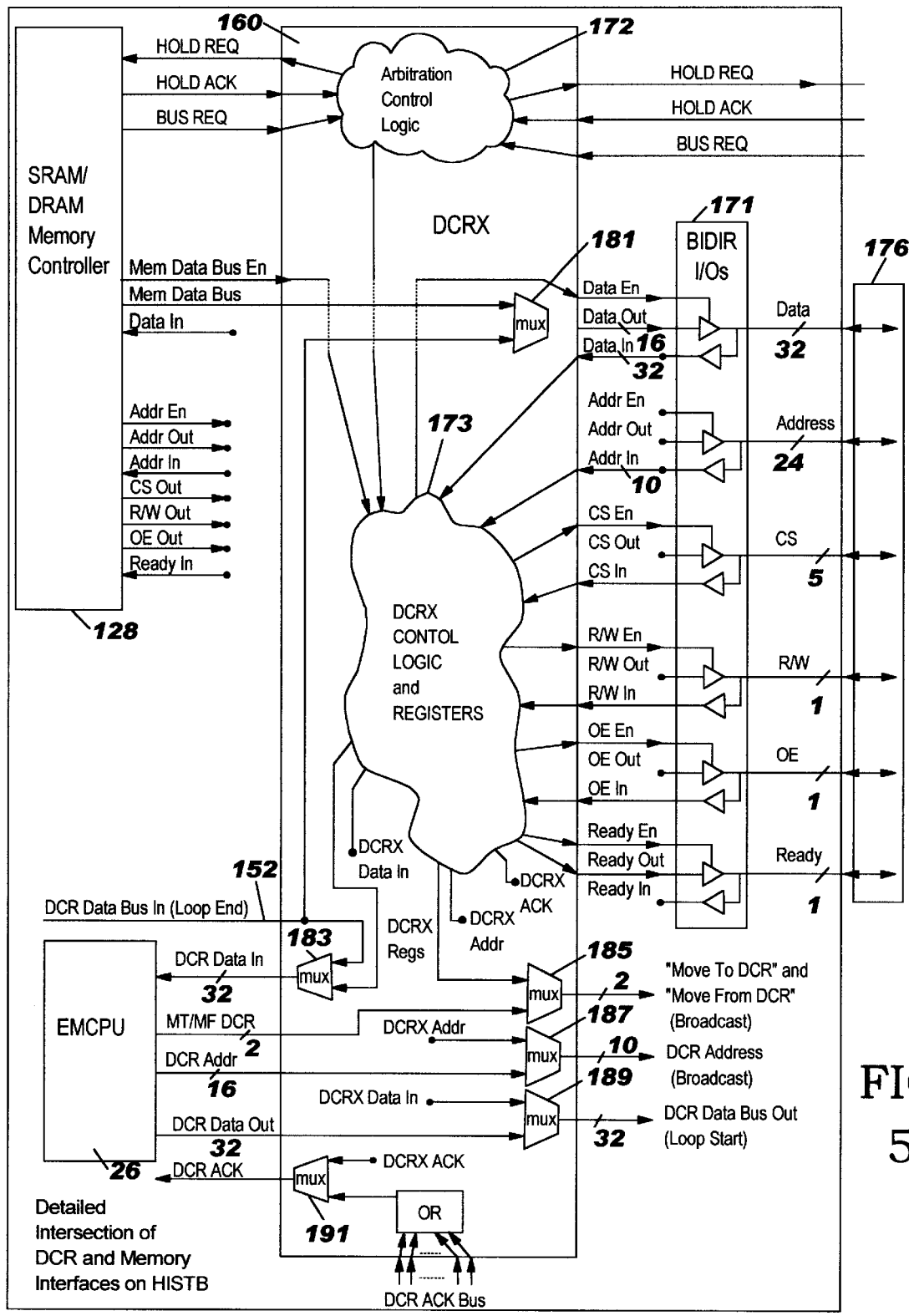
FIG. 5 provides details of how the data, address and control signals from both the External Memory Bus and the DCR Bus (within the HISTB chip) connect in and around the DCRX.

FIG. 5 provides details of how the data, address and control signals from an External Memory interface 176 and the DCR bus 152 (within the HISTB chip) are coupled to the DCRX logic 160.

The arbitration control logic 172 acts independently from the DCRX control logic 173 but the DCRX control logic 173 does use arbitration information in determining the states of the bus control signals. All the External Memory Bus signals and buses are bidirectional so the HISTB 12 may act as both a source and a destination of memory operations, however, only the SRAM/DRAM memory controller 128 drives the Address Out and Address Enable signals and this only occurs during an External Memory operation (the DCRX logic 160 is not involved). In a preferred embodiment, ten bits of the Address In bus are used directly as the 10 bit DCR Address when the DCRX logic 160 is handling a DCR operation.

The External Memory Bus Data In (32 bits) is driven onto the DCR Data Bus by the CPU 14 when the DCRX logic 160 is performing a DCR Write (also known as Move-To-DCR, i.e., MTDCR). The data returned from the DCR data bus is directed out onto the External Memory Bus Data Out when the DCRX logic 160 is performing a DCR Read (also known as Move-From-DCR, i.e., MFDCR).

Referring now to the bidirectional I/Os 171, the direction of the Chip Select (CS) from the bidirectional I/Os 171 is determined by a DCRX register bit in DCR control logic 173 at system initialization. This bit is set to allow or disallow DCRX operations to occur. Reprogramming this bit during system operations could result in both processors driving the CS. One of the external processor's Chip Select (CS) signals must be dedicated to accessing the DCR registers on the HISTB 12 so it is not necessary for the DCRX logic 160 to decode any of the bits of the address bus. The importance of this dedicated pin will be described in detail later in the specification. The CS signal will indicate when a memory operation, initiated by the external processor, is targeted for the DCR registers. It will be up to the individual DCR slaves to decode the 10 bits of the Address bus which are passed on as the DCR address.

The directions of the R/W, OE and Ready lines are all controlled by the DCRX control logic 173 since they must reverse direction only for External Memory bus operations addressing the DCR registers. For those operations these three signals are used to synchronize the interface just as if the HISTB 12 were an SRAM.

As is seen ADDR EN, ADDR OUT, ADDR IN, CS OUT, R/W OUT, OE OUT, READY IN signals from memory controller 128 have dots connected thereto. BID IR I/Os 171 have similarly the same signals with dots connected thereto. These dots represent connections therebetween without necessarily being connected to or driven by the DCRX logic 160.

Similarly, DCRX DATA IN, DCRX ADDR and DCRX ACK signals provided from DCRX control logic 173 have on page connectors dots connected thereto. Multiplexer 187 has the DCRX ADDR signal input thereto connected to a dot. Multiplexer 189 has the DCRX DATA IN input thereto connected to a dot. Multiplexer 191 has the DCRX ACK input thereto connected to a dot. These dots represent internal connections within the DCRX logic 160. The select lines of the multiplexers 181, 183, 185, 187, 189 and 191 are controlled by the DCRX Control Logic 173. These multiplexers 181–191 allow both the External Memory Bus 176 and the DCR bus 152 to be taken over by the DCRX logic 160 or the Memory Controller 128 and EMCPU 26 to assume control of those buses and perform as they would if the DCRX logic 160 was not in the system.

FIG. 6 illustrates a complete cycle in the changes of state in the arbitration for the External Memory Bus. Referring to FIGS. 3 and 6 together the cycle begins with the EMCPU 26 using the bus without a bus request from the EXCPU 14 (state A): When the EXCPU 14 needs access to the Ext Mem bus it raises the EX_BUSREQ and the arbiter immediately responds by raising the HOLDREQ signal to the EMCPU 26 (state B). Some time later, when the EMCPU 26 completes its bus operation, it will relinquish control of the bus by responding to the HOLDREQ by raising HOLDACK and will stop driving the bidirectional data bus, address bus, and control signals. The arbiter will immediately respond by dropping the HOLDREQ to the EXCPU 14 (state D). When the EXCPU 14 is assuming control of the bus it will drop HOLDACK and BUSREQ (state E). States G through J are identical to states B through E except that the roles of the EMCPU 26 and EXCPU 14 are reversed. Note that these states do not necessarily indicate individual cycles of the system clocks and that the EMCPU 26 and the EXCPU 14 are not necessarily even running at the same frequency.

FIG. 7 illustrates a special case that can occur in the arbitration sequence. When a processor (i.e., EMCPU 26) is giving up control of the bus (raising HOLDACK) it may already have the need to regain control of the bus for another pending operation so it will simultaneously raise BUSREQ with HOLDACK. In this case there are internal controls within the arbiter to make sure that the HOLDREQ to the other processor (ie., EXCPU 14) is held low until that other processor indicates that it is taking control of the bus (dropping HOLDACK) so a deadlock situation does not occur. This is different from the operation of HOLDREQ indicated in states B and G of FIG. 6.

Figure 8:
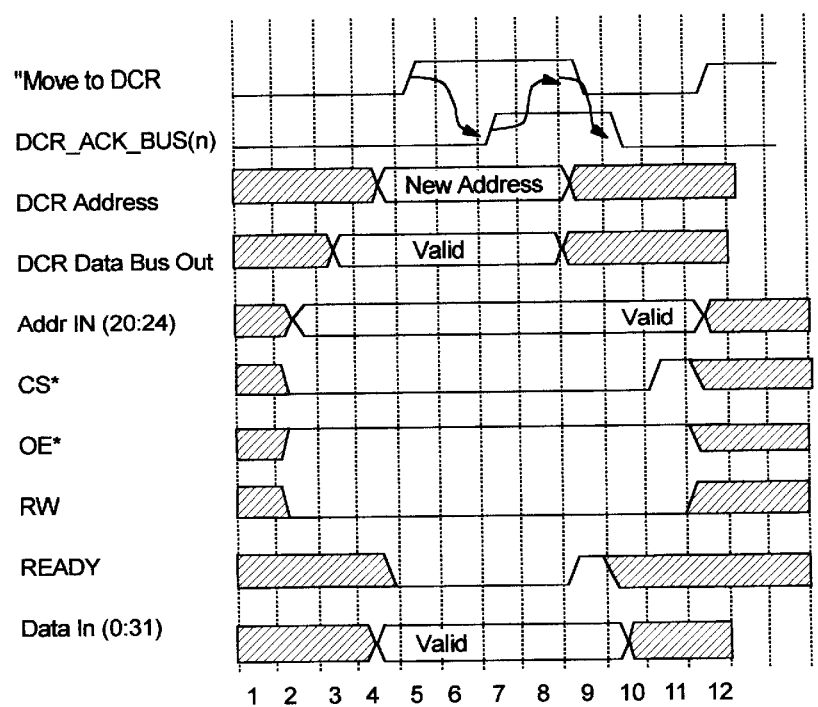
FIG. 8 illustrates a timing diagram showing the synchronization of signals between the External Memory Bus and the DCR bus during an EXCPU write to a HISTB DCR via the DCRX.

FIG. 8 illustrates a timing diagram showing the synchronization of signals between the External Memory Bus and the DCR bus during an EXCPU 14 write to a DCR register via the DCRX logic 160.

Figure 9:
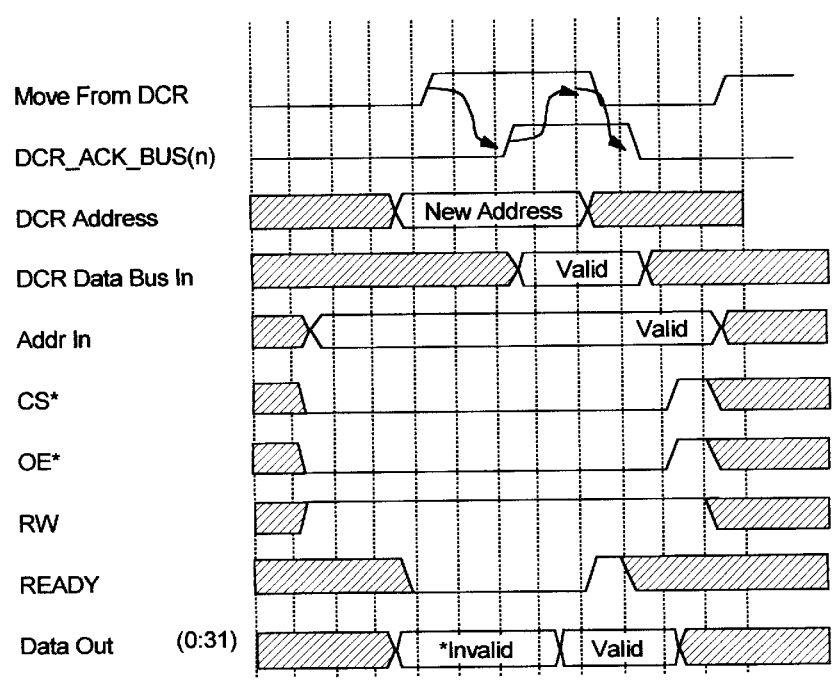
FIG. 9 illustrates a timing diagram showing the synchronization of signals between the External Memory Bus and the DCR bus during an EXCPU 14 read from a HISTB 12 DCR via the DCRX.

FIG. 9 illustrates a timing diagram showing the synchronization of signals between the External Memory Bus and the DCR bus 152 during an EXCPU 14 read from a DCR register via the DCRX 160.

One of the important features of this implementation is that the number of pins required can be significantly reduced to control the memory interface. For example, if the DCR bus is 32 bits wide the EMCPU 26 requires 32 pins for data in, the MTDCR/MFDCR require 2 bits or 2 pins, the DCR address requires 10 bits or 10 pins, the DCR data out requires another 32 bits or 32 pins, and the DCR acknowledge requires 1 bit or 1 pin. Accordingly, there is a total of 77 bits for the internal memory interface at the input of the EMCPU. This translates into a total of 77 internal pins for the device control register bus. Providing external control of the DCR bus 152 to the EXCPU 14 without sharing I/Os of the memory interface would require a significant number of dedicated chip I/O. The present invention demonstrates the pin savings of the shared memory and register interface.

At the output of the bidirectional I/Os 171, only 64 bits or pins are required to provide access to both the SRAM/DRAM memory by the EMCPU and allow the EXCPU to access the DCR bus. For example, if the data bus is the same, 32 bits wide, the address is 24 bits wide, the chip select is 5 bits wide, the read write is 1 bit wide, and the output enable is 1 bit wide and the ready is 1 bit wide, a total of 64 pins are needed to allow an external DCR master to control the DCR bus. The number of additional pins required is reduced by dedicating one chip select (CS) for providing access to the DCRX control logic and registers. Accordingly, the CPU 14 can have access to the DCR bus 152 via the memory arbitration and asserting the chip select (CS) pin along with the appropriate SRAM interface signals. Accordingly, by providing a dedicated chip select signal for accessing the DCR registers it is not necessary for the DCRX logic 160 to decode any of the bits of address bus.

2. Common Memory Space for Both EMCPU and EXCPU

Shared memory for both SRAM and DRAM 121 is provided in a glueless fashion between the two processors. This provides a common memory space for both the EXCPU 14 and the EMCPU 26 to pass data back and forth very efficiently. Only a command header and memory pointers need to be passed between the two processors via a memory mailbox (dedicated contiguous section of memory) unique to each processor at agreed upon memory locations in the common memory space. The SRAM/DRAM interface controller 128 in the HISTB controller 12 and the EXCPU 14 both tri-state the memory bus when the bus is requested and allow the requesting device access to the common memory. This arbitration insures that a memory collision is avoided. In a preferred embodiment, pull up resistors on the memory control lines (active low) to insure the transition from HISTB controller 12 driving inactive->tri-state->EXCPU 14 driving inactive and vice versa does not cause a glitch. When DRAM 121 is shared, the memory bus owner (that is both the EXCPU 14 and the HISTB controller 12) should in a preferred embodiment refresh the DRAM 121 to ensure the integrity of the memory contents.

3. Low Latency Notification Path from EMCPU to EXCPU

The low latency notification path from the EMCPU 26 to the EXCPU 14 is needed to insure that real-time critical tasks are dispatched from the EMCPU 26 to the EXCPU 14 as they arise. Significant delays for processing these tasks can cause significant problems. This requirement was met by utilizing the GPIO 144 output as an interrupt input to the EXCPU 14.

Figure 10:
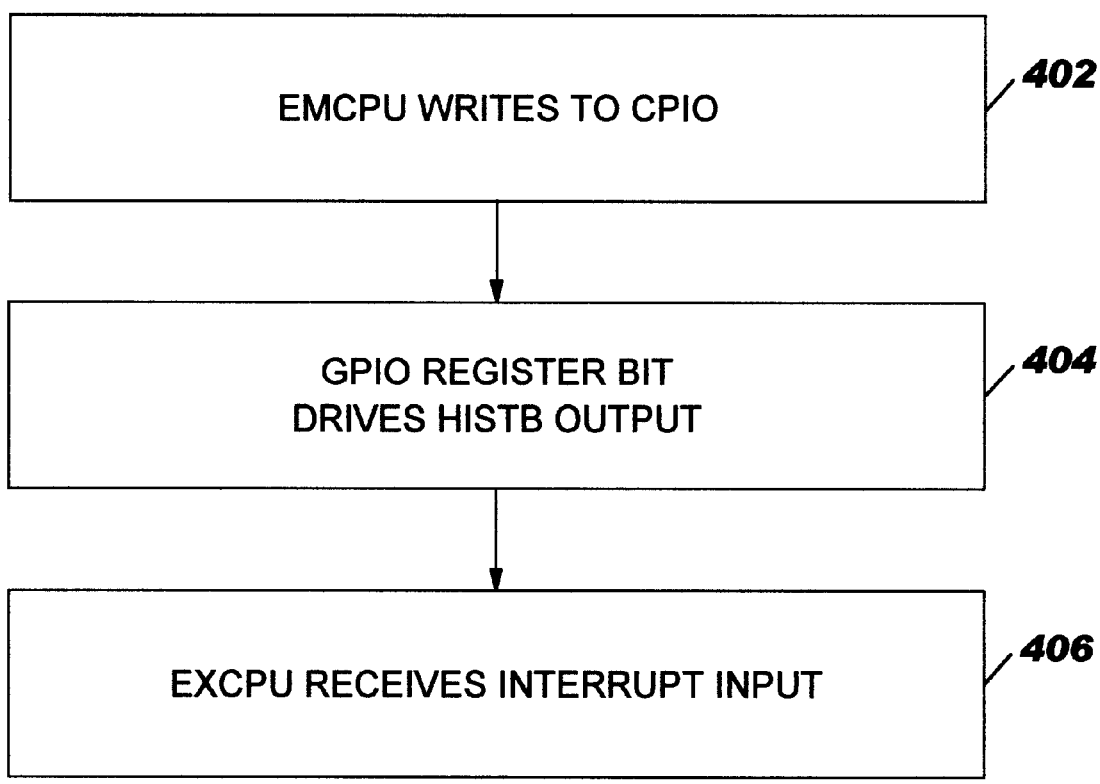
FIG. 10 is a flow chart illustrating the notification path from the embedded CPU to the external CPU.

FIG. 10 illustrates a flow chart for execution of the low latency notification path between EMCPU 26 and the EXCPU 14. First, the EMCPU 26 writes to memory mapped register bit in GPIO via step 402, via the execution of a "Store" instruction to the GPIO 144 register. This is accomplished via PLB and OPB Bus data transfer setting the general purpose output. Next the GPIO 144 (FIG. 3) register bit drives HISTB output via step 404. This output is connected to EXCPU 14 external interrupt input. Finally, the EXCPU 14 receives interrupt input, branches to interrupt service routine handling the necessary system task, via step 406.

4. Low Latency Notification Path from EXCPU to EMCPU

The low latency notification path from the EXCPU 14 to the EMCPU 26 is needed to insure that real-time critical tasks are dispatched from the external CPU to the embedded CPU as they arise. Significant delays for processing these tasks can cause significant problems. This requirement was met by providing interrupt generation capability by the EXCPU 14 writing to a bit of a DCRX 160 register space on the HISTB controller 12 that creates an interrupt to the EMCPU 26.

Figure 11:
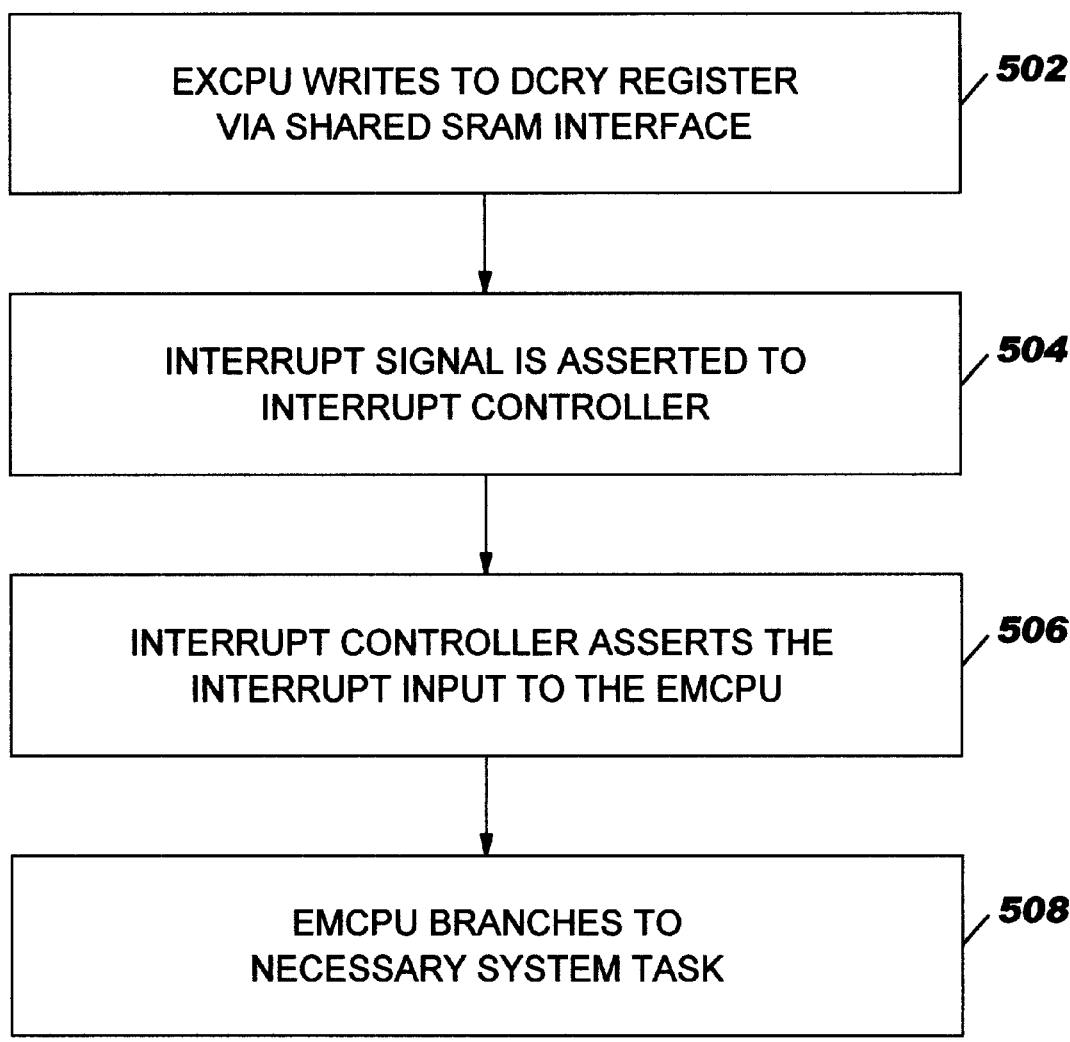
FIG. 11 is a flow chart of the notification path from the external CPU to the embedded CPU.

FIG. 11 is a flow chart of the notification path from the EXCPU 14 to the EMCPU 26. First, the EXCPU 14 gains access to the DCRX logic 160 and writes to the control register 159 via the shared SRAM/DRAM interface controller 128, via step 502. Next, the write to the logic control register 159 causes the assertion of the interrupt signal to the interrupt controller 107, via step 504. Next the interrupt controller 107 then asserts the interrupt input to EMCPU 26, via step 506. Finally, the EMCPU 26 receives the interrupt input, branches to the interrupt service routine handling the necessary system task, via step 508.

An alternative approach that does not require the EXCPU 14 to gain access, through arbitration, of the common memory space is to use a general purpose output of the EXCPU 14 that drives the HISTB controller's 12 external interrupt input directly.

5. On-Chip Memory (OCM) 104 Reducing Memory Fetches for Instruction Execution

Both OCM 104 instruction cache 105 and data cache 109 provide a significant quantity of instruction and data storage on-chip. Having both the EXCPU 14 and EMCPU 26 fetch data and instructions from a common memory simultaneously is feasible in this system; however, it is anticipated that the inefficiencies of the memory bus arbitration will reduce the performance of the total system. To reduce system costs there is no glue logic required to add the EXCPU 14 external processor. With the addition of some bus transceivers and added system cost it is feasible to isolate the HISTB controller's 12 memory from the EXCPU 14 memory.

This allows for simultaneous instruction or data fetch from each CPUs isolated memory without collision and reduces the amount of shared/common memory arbitration. If the desired amount of instruction store for the EMCPU 26 exceeds the amount of on-chip instruction storage, the external buffering provides a gateway, enabled only when inter-CPU communication is required.

Optimum performance in the "glueless" multiprocessor architecture is achieved when the majority of program storage for the embedded processor is executed from the OCM 14 and avoids instruction fetch from shared/common memory. For the HISTB controller 12, the EMCPU 26 and the DMA controller 126 handle all the data management for the peripheral subsystem components to/from the shared/common memory. The EMCPU 26 insures that data transfer to and from the shared memory DRAM 121 is efficient with a maximum amount of burst type traffic and minimum to no instruction memory fetch.

6. Staged Power-On Reset Mechanism

Another issue to be resolved in multiprocessor configuration is the system initialization. If both EXCPU 14 and EMCPU 26 receive a common reset, they would both attempt to fetch shared/common memory at the same time. By holding the HISTB controller 12 (and therefore the EMCPU 26) in reset until the EXCPU 14 was out of reset and initialized, then releasing the reset which had been holding the HISTB's I/O in tri-state, proper memory arbitration is implemented. Each processor 14 and 26 reads the same boot code but executes different branches of the code depending upon the result of the processor identification test. This allows the same ROM (or FLASH) memory to hold a single common boot routine that can service both processors. Control of the HISTB controller 12 reset is done via on-card logic implementing a general purpose I/O function controlled by the EXCPU 14.

7. CPU Inter-Communication Software

The EMCPU 26 in a multiprocessor configuration services all the peripheral subsystem communications. The EMCPU 26 is responsible for all data communications to/from memory and the peripheral subsystem. In effect, the EMCPU 26 becomes an I/O processor for the EXCPU 14. Because the peripheral subsystem can tolerate more system latency than the MPEG subsystem, this is an effective division of labor between the two processors.

Conclusion

A system and method in accordance with the present invention provides for an embedded CPU system which is upgradeable through the use of an external CPU which can be utilized therewith. The embedded CPU system includes a CPU and a plurality of devices which are accessible by the CPU, via a device control register bus. The embedded CPU system includes logic coupled to the device control register bus for allowing access to the devices within the embedded CPU system by an external CPU.

In a preferred embodiment the present invention provides a highly integrated set top box controller with a processor performance that services the low-end with the added advantage of additional performance with the EMCPU operating as an I/O assist processor to the EXCPU. When the EXCPU operates as the primary processor these two processors serve as a high end set top box controller. A system and method in accordance with the present invention can also preserve much of the software programming model when migrating from a low end processor set top box controller to a higher end solution. A system and method in accordance with the present invention also offers a choice of preserving much of the existing software investment by allowing different processor architectures to function as the EXCPU.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An embedded central processing unit (EMCPU) system comprising:
   a CPU subsystem, the CPU subsystem comprising an embedded CPU and on-chip memory (OCM) coupled to the embedded CPU, wherein the OCM reduces memory fetches for instruction execution;
   a plurality of devices;
   a bus coupled to the plurality of devices; wherein the bus is a device control register (DCR) bus; and
   DCR extension (DCRX) logic coupled to the DCR bus for allowing access to the devices by an external CPU (EXCPU) via the DCR bus, wherein the DCRX logic includes arbitration control logic for controlling access to the DCR bus by the EMCPU and the EXCPU, and DCRX control logic and registers for controlling the DCR bus.

2. The EMCPU system of claim 1 wherein the logic includes bus extension logic.

3. The EMCPU system of claim 1 wherein the embedded CPU subsystem further comprises:
   an interrupt controller coupled to the embedded CPU.

4. The EMCPU system of claim 1 wherein the EMCPU system includes a peripheral subsystem coupled to the CPU subsystem.

5. The EMCPU system of claim 4 wherein the peripheral subsystem includes a general purpose I/O (GPIO) device.

6. The EMCPU system of claim 5 wherein a first low latency path is provided from the EMCPU to the EXCPU.

7. The EMCPU system of claim 6 wherein the EMCPU and EXCPU share a common memory interface.

8. The EMCPU system of claim 7 wherein the shared memory is utilized for communication between the EXCPU and the EMCPU.

9. The EMCPU system of claim 6 wherein the first low latency path comprises:
   means for causing the EMCPU to write to the GPIO device;
   means for causing the GPIO device to drive an output of the EMCPU system; and
   means responsive to the GPIO device causing means for receiving an interrupt input by the EXCPU.

10. The EMCPU system of claim 9 wherein a second low latency path is provided from the EXCPU to the EMCPU.

11. The EMCPU system of claim 10, wherein the second low latency path comprises:
    means for causing the EXCPU to write to the DCRX logic;
    means responsive to the EXCPU causing means for asserting an interrupt to the interrupt controller;
    means responsive to the interrupt controller asserting means for asserting the interrupt to the CPU subsystem; and
    means for causing the CPU subsystem to branch to a system table.

12. A highly integrated set top box (HISTB) comprising:
    a CPU subsystem, the CPU subsystem comprising an embedded CPU (EMCPU) and on-chip memory (OCM) coupled to the EMCPU wherein the OCM reduces memory fetches for instruction execution;
    an MPEG subsystem;
    a memory subsystem;
    a peripheral subsystem;
    at least one bus for allowing communication between the CPU subsystem, the MPEG subsystem, the memory subsystem and the peripheral subsystem;
    a device control register (DCR) bus for coupling the CPU subsystem, the MPEG subsystem, and the memory subsystem; and
    DCR extension (DCRX) logic coupled to the DCR bus for allowing access to the CPU subsystem, memory subsystem and the MPEG subsystem by an external CPU (EXCPU) via the DCR bus, wherein the DCRX logic includes arbitration control logic for controlling access to the DCR bus by the EMCPU and the EXCPU, and DCRX control logic and registers for controlling the DCR bus.

13. The HISTB of claim 12 wherein the DCR bus is implemented as a daisy chained DCR ring.

14. The HISTB of claim 12 wherein the DCR extension (DCRX) logic which provides a path for the EMCPU and EXCPU to access registers attached to the DCR bus.

15. The HISTB of claim 12 wherein the CPU subsystem further comprises:
    an interrupt controller coupled to the embedded CPU.

16. The HISTB of claim 15 wherein the memory subsystem comprises:
    a DMA controller coupled to the CPU subsystem;
    a cross bar switch coupled to DMA controller;
    a DRAM/SRAM interface coupled to the memory interface and the crossbar switch; and
    an SRAM interface coupled to the crossbar switch.

17. The HISTB of claim 14 wherein the at least one bus includes:

first and second buses for allowing communications between the CPU subsystem, the memory subsystem and the MPEG subsystems.

18. The HISTB of claim 17 wherein the MPEG subsystem comprises:
   an MPEG transport demultiplexer coupled to one of the first and second buses;
   an MPEG audio decoder coupled to the MPEG transport demultiplexer; and
   an MPEG video decoder coupled to the MPEG transport demultiplexer.

19. The HISTB of claim 18 wherein the peripheral subsystem includes a general purpose I/O (GPIO) device.

20. The HISTB of claim 19 wherein the at least one bus includes an OPB bus which allows for communication between the peripheral subsystem and the EMCPU subsystem, memory subsystem and MPEG subsystem.

21. The HISTB of claim 20 wherein a first low latency path is provided from the EMCPU to the EXCPU.

22. The HISTB of claim 21 wherein the first low latency path comprises:
   means for causing the CPU subsystem to write to the GPIO device;
   means for causing the GPIO device to drive an output of the HISTB; and
   means responsive to the GPIO device causing means for receiving an interrupt input by the EXCPU.

23. The HISTB of claim 22 wherein a second low latency path is provided from the EXCPU to the EMCPU.

24. The HISTB of claim 23 wherein the second low latency path comprises: means for causing the EXCPU to write to the DCRX register space;
   means responsive to the EXCPU causing means for asserting an interrupt to the interrupt controller;
   means responsive to the interrupt controller asserting means for asserting the interrupt to the CPU subsystem; and
   means for causing the CPU subsystem to branch to a system table.

25. The HISTB of claim 24 which includes a dedicated signal for providing access to the logic by the EXCPU.

26. The HISTB of claim 25 wherein the arbitration control logic receives arbitration signals from the memory controller and the EXCPU, the DCRX control logic receives arbitration information from the arbitration control logic and determines the states of the signals for the DCR bus; and
   wherein the DCRX logic further comprises a plurality of multiplexers for allowing an external bus and the DCR bus to be controlled by the DCRX logic.

27. The HISTB of claim 26 which includes a staged power on reset mechanism for the EXCPU and the EMCPU.

28. The HISTB of claim 27 wherein the staged power on reset mechanism comprises:
   means for holding the EMCPU in reset until the EXCPU is out of reset and initialized; and
   means for releasing the reset of the EMCPU responsive to the EXCPU being out of reset and initialized.

* * * * *